Nov. 18, 1969     P. H. ZAVOD ET AL     3,478,769

AUTOMATIC CONTROL SYSTEM FOR DECOMPRESSION CHAMBER

Filed Nov. 29, 1967

INVENTORS
PIERCE H. ZAVOD
JOHN L. ULRICH

BY

ATTORNEY

United States Patent Office 3,478,769
Patented Nov. 18, 1969

3,478,769
AUTOMATIC CONTROL SYSTEM FOR DECOMPRESSION CHAMBER
Pierce H. Zavod, King of Prussia, Pa., and John L. Ulrich, Somerdale, N.J., assignors to the United States of America as represented by the Secretary of the Navy
Filed Nov. 29, 1967, Ser. No. 686,401
Int. Cl. B63c 11/32; G05d 19/02
U.S. Cl. 137—118
8 Claims

ABSTRACT OF THE DISCLOSURE

An automatic control system for controlling pressure in a closed container having a plurality of carefully sized exhaust valves automatically operated to decrease the pressure in a predetermined increment when an equalized pressure condition is established between the container and a small chamber connected thereto. An automatically sequenced valve alternately establishes and removes the equalized pressure condition between the container and the chamber.

---

The invention described herein may be manufactured and used by or for the Government of the United States of America for governmental purposes without the payment of any royalties thereon or therefor.

The present invention relates particularly to automatic control apparatus for decreasing pressure in a decompression chamber or the like in selected increments and at a predetermined rate.

Presently, there is a great military and scientific need for a pressure control system which can operate automatically and with increased accuracy. The decompression chambers in use today are for the most part operated manually by adjusting pressure relief valves and observing the decrease in chamber pressure on gauges. While these devices are suitable for most general applications, they do not have the accuracy necessary to control chamber pressure within the close tolerances required by deep, saturation diving techniques. In addition, almost all applications where precise control of pressure in a container is desired, for example, man in the sea chambers and hospital hyperbaric chambers, it would be of extreme value and at times a necessity to accomplish this automatically at a substantially constant rate, thereby freeing the attendant personnel to perform other operations.

It is therefore a principal object of the present invention to provide a novel and improved control system whereby the decrease of pressure in a closed container may be accomplished automatically in selected increments and at a substantially constant rate.

It is another object of the present invention to provide a novel and improved automatic pressure control system which is relatively simple to operate and yet highly accurate and reliable in use.

Figure 1:
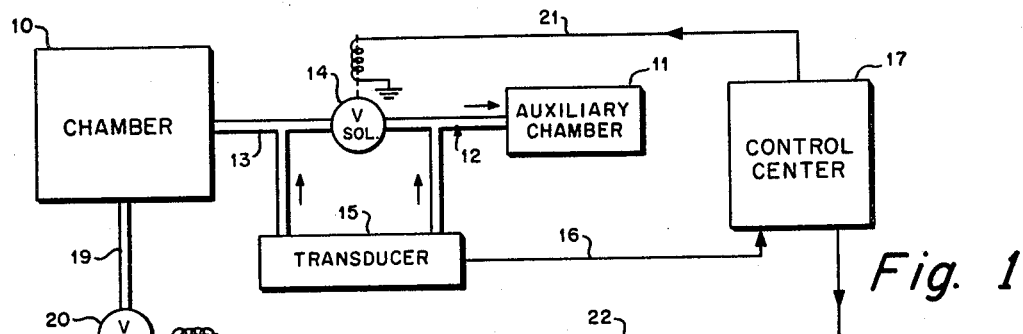
Figure 2:
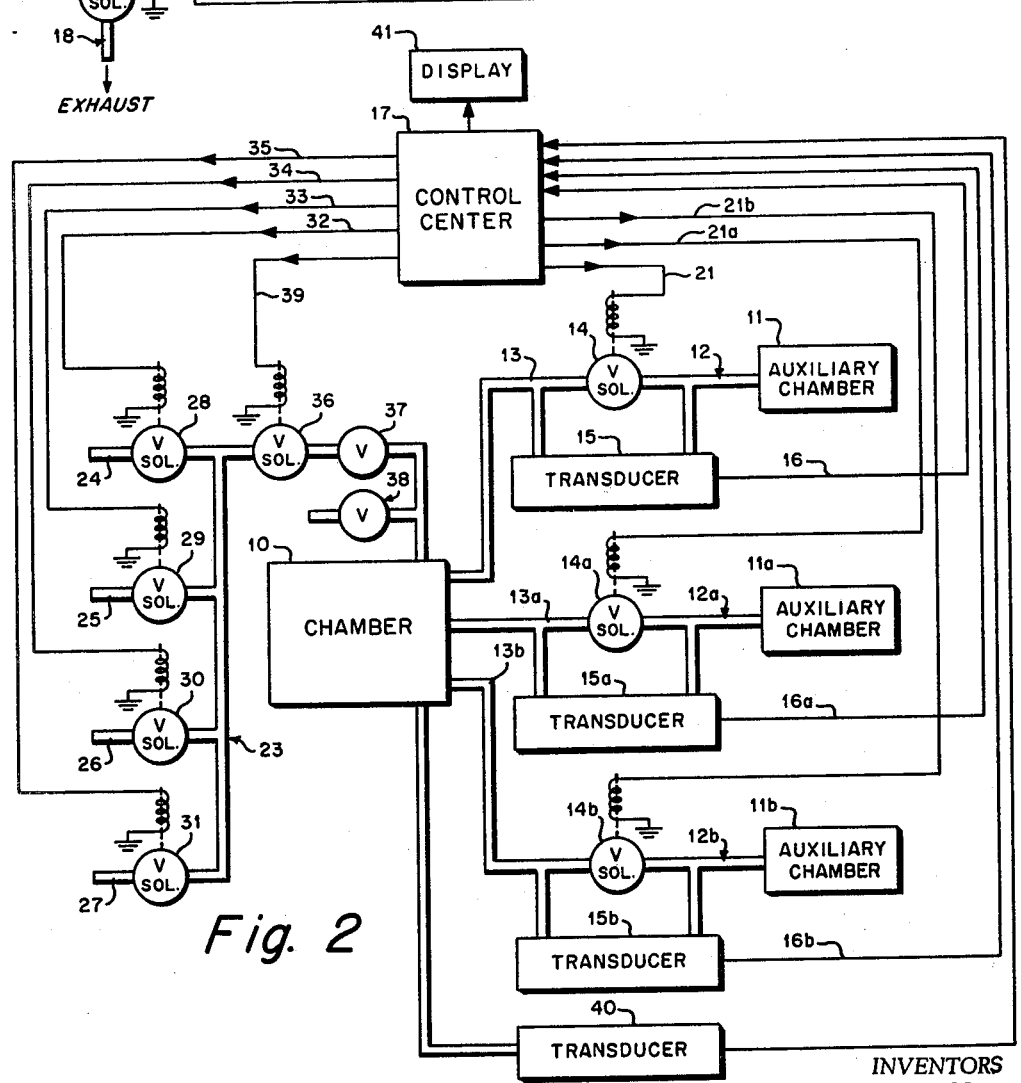

Other objects and many of the attendant advantages of this invention will be readily appreciated as the same becomes better understoood by reference to the following detailed description when considered in connection with the accompanying drawing wherein:

FIGURE 1 of the drawing is a functional block diagram of the present invention; and FIGURE 2 of the drawing is a diagrammatic representation of a preferred embodiment of the present invention.

Referring now to the details of the drawing, wherein like reference numerals apply to like parts throughout, and more particularly to FIG. 1, 10 designates a decompression chamber or the like for which it is desired to decrease the pressure therein a predetermined amount. An auxiliary pressure chamber 11 is connected to the decompression chamber 10 by a valve controlled passageway 12 comprising a conduit 13 and a solenoid valve 14, or any other suitable conventional means which can be controlled by an electrical signal thereto to close off the conduit 13. A pressure responsive means 15, such as a pressure transducer having a range from −5 to +5 feet of sea water, for example, is connected on either side of the valve 14 and converts the differential pressure variations between the chambers 10 and 11 into a proportional output signal. This output signal is transmitted over the conductor 16 to a control center 17, whose operation will become more apparent hereinafter.

Exhaust valve means 18 comprising an exhaust line 19 and a solenoid valve 20 are connected to communicate between the interior and exterior of the decompression chamber 10 to control the exhaust of air therefrom. A control signal is transmitted by way of conductors 21 and 22 from the control center 17 to actuate the solenoid valves 14 and 20 respectively which, in turn, maintain the desired decrease in decompression chamber pressure.

In operation, the decompression chamber 10 is charged to an initial absolute pressure. The valve 14 is opened until the differential pressure between the decompression chamber 10 and the auxiliary pressure chamber 11 has equalized. Because the volume of the auxiliary chamber 11 is substantially less than the volume of the chamber 10, for example, the volume of chambers 10 and 11 may be 1000 cubic feet and 4 cubic inches, respectively, the pressure at which the two chambers equalize will be the pressure of the decompression chamber 10, with no appreciable pressure drop therein.

With the pressure between the two chambers equalized, the pressure responsive means 15 will have no output signal for the control center 17 to receive. Upon sensing this condition, the control center is programmed to transmit a control signal through the conductors 21 and 22 to the solenoid valves 14 and 20. This pair of control signals will operate to close valve 14 thereby isolating the chambers 10 and 11 from each other, and will open valve 20 to allow an exhaust of air from the decompression chamber 10.

With the decrease in pressure, the control center 17 will be receiving a signal from the pressure responsive means 15 which is proportional to the differential pressure between the two chambers. At a certain predetermined pressure difference, two feet, for example, the control center will transmit a pair of signals to the solenoid valves, opening valve 14 and closing the exhaust valve 20. This condition will be maintained, that is, no exhaust of air from the decompression chamber 10 until the pressure between the two chambers is again equalized. The above mentioned process is then repeated until another increment of pressure decrease has been obtained. The process continues until a predetermined operating pressure has been reached or until the decompression chamber pressure is at sea level.

The value of the increment of pressure decrease for each step is, of course, a matter of choice depending only on the selection of a pressure transducer and on the prior programming of the control center. Accuracy of the system is greatly increased by choosing the range of the differential pressure transducer to be much smaller than the total range of the pressure in the decompression chamber. For example, if a pressure transducer is employed having a range from −5 feet to +5 feet and the total range of pressure in the chamber is 1000 feet, by using the transducer over this limited range, 1/10 of the total range, the accuracy of the transducer is increased thereby increasing the overall accuracy of the system.

Referring now to FIG. 2 of the drawing, a preferred embodiment of the invention is shown including safety features and additional means to provide a substantially constant rate of pressure decrease over a wide range of values. The basic apparatus and operation of FIG. 2 is substantially the same as that described hereinabove.

In addition to the auxiliary pressure chamber 11 and its associated apparatus 12–16, two back-up auxiliary pressure chambers 11a and 11b are connected to the decompression chamber 10 by the valve controlled passageways 12a and 12b respectively. Each of the passageways comprise a conduit, 13a and 13, and a solenoid valve, 14a and 14b, which is controlled by a signal transmitted by way of a conductor, 21a and 21b, from the control 17. Back-up pressure responsive means 15a and 15b are connected on either side of the valves 14a and 14b respectively, and convert the differential pressure variations between the back-up chamber into proportional output signals. These output signals are transmitted over the conductors 16b and 16c to the control center 17. An absolute pressure responsive means 40 is also connected to the control center 17 and develops an output signal proportional to the pressure of the decompression chamber 10.

An exhaust manifold assembly 23 having four exhaust lines 24–27 is connected to communicate between the interior and exterior of the decompression chamber 10 to control the exhaust of air therefrom. Solenoid valves 28–31 are connected in the exhaust lines 24–27 respectively and are selectively actuated by control signals transmitted by way of the conductors 32–35 from the control center 17. The valve controlled exhaust lines 24–27 have flow areas sized in the ratio 1:2:4:8, so that by selectively actuating the solenoid valves 28–31 a total of fifteen combinations of flow area may be obtained in a manner which will be more apparent hereinafter.

Included in the exhaust manifold assembly 23, in series with the exhaust lines 24–27, is a normally open emergency solenoid valve 36, a normally open manual emergency valve 37 and a normally closed manual valve controlled exhaust line 38. The emergency valve 36 is actuated by a control signal transmitted by way of a conductor 39 from the control center 17.

Also connected to the control center 17 is a visual display means 41 which monitors the operation of the system. The function of the control center 17 required according to this invention can be accomplished by a variety of commercially available computers and their associated equipment; generally, the control center 17 comprises an analog to digital converter receiving the output signal from the pressure transducers 15 and 40. The resultant information signal is then transmitted to a preconditioned digital computer and finally to a digital to analog converter or valve drive logic means to actuate and control the various solenoid valves in the system.

The two additional output signals from the back-up pressure transducers 15a and 15b add levels of redundancy to the system for reliability and safety. The additional output signals from the back-up transducers are continuously received by the control center 17, but the control center is not operatively responsive to the signals until there is a failure of the main pressure transducer 15 or of the valve controlled passageway 12 to close upon transmission of a control signal thereto. If there is such a failure the control center will sample and respond to the signal from the back-up pressure transducer 15a and the system will continue to operate without a shutdown. The signal from the back-up transducer 15b is not sampled by the control center 17 until, or if, there is a failure of the back-up transducer 15a or of the valve controlled passageway 12a to close properly. Again, in case of such a happening, the system will continue to operate without a shutdown.

In operation, the system functions essentially as described for the system in FIG. 1. When the pressure is equalized between the decompression chamber 10 and the auxiliary chamber 11, the control center will operate to close the valve 14 and open a certain predetermined combination of valve controlled exhaust lines 24–27. The opening of the valves 28–31 by a signal from the control center 17 is dependent on the absolute pressure which the decompression chamber 10 has reached. The signal produced by the pressure transducer 40, which is proportional to the absolute pressure, is received by the control center 17 which computes which exhaust valves 28–31 are to be opened. A combination of valves will be actuated to produce a flow area which will maintain a constant time rate of decrease of pressure irrespective of the value of the absolute pressure. For example, at an initial decompression chamber pressure of 1000 feet, the control center will transmit a signal to actuate the valve controlled exhaust line having the smallest volume so that the incremental decrease of pressure will take place within a predetermined time period; when the decompression chamber pressure has reached a value of 2 feet, the signal will be sent to actuate all four of the valve controlled exhaust lines (the maximum available flow area), thereby allowing the chamber pressure to reach a sea level condition within the same predetermined time period as the initial incremental decrease. For pressures between the two extremes, a flow area will be established from a combination of valve controlled exhaust lines (15 combinations) to maintain the desired constant rate of pressure decrease.

If, as previously described, there is a failure of the pressure transducer 15 or the valve 14, the control center will be operatively responsive to the back-up transducer 15a. If there is a failure of the back-up transducer 15a or its associated valve 14a, then the control center becomes operatively responsive to the second back-up transducer 14b. It is to be noted that the three transducers and their associated equipment are all identical in construction and operation and perform in exactly the same manner. The employment of additional back-up transducers increases the reliability and safety of the system, which system continues to perform as if there were but a single pressure transducer.

If there is a failure of the entire system to maintain a substantially constant rate of decrease of pressure, that is, if there is a complete breakdown of the differential pressure transducers 15, 15a and 15b or if the valve controlled exhaust lines 24–27 fail to respond to their associated control signals, the control center 17 will transmit a signal by way of the conductor 39 to close the emergency valve 36 thereby preventing the exhaust of air through the exhaust lines 24–27. This condition will be annunciated on the visual display means 39 thereby indicating the situation to the operating personnel so that the decrease in pressure may continue to be controlled by manipulating the manual valve controlled exhaust line 38. The emergency manual valve 37 is inserted in the exhaust manifold assembly 23 as an additional safety precaution to prevent the exhaust of air from the exhaust lines 24–27 upon the failure of the emergency valve 36 to actuate after receiving a control signal. It is to be noted that the visual display means 41 can also be employed to indicate any necessary system operating conditions and also may be used in cooperation with an emergency alarm signal.

Obviously many modifications and variations of the present invention are possible in the light of the above teachings. It is therefore to be understood that within the scope of the appended claims the invention may be practiced otherwise than as specifically described.

What is claimed is:

1. An automatic control system for decreasing pressure in a decompression chamber or the like in selected increments, comprising:

(a) an auxiliary pressure chamber, the volume of said auxiliary chamber being substantially less than that of the decompression chamber;

(b) a valve controlled passageway connecting said chambers together;

(c) exhaust valve means communicating between the interior and exterior of the decompression chamber and controlling the exhaust of air therefrom;

(d) differential pressure responsive means connected between said chambers for developing an output signal proportional to the differential pressure;

(e) and a control center receiving as an input the signal from said differential pressure responsive means for controlling said valve and said exhaust valve means, said control center opening said valve and closing said exhaust valve means to equalize the pressure in said chambers when a predetermined increment of pressure difference exists therebetween, the condition of said valve and exhaust valve means being reversed when the pressure is equalized.

2. An automatic control system for decreasing pressure in a decompression chamber or the like in selected increments and at a predetermined fixed rate, comprising:

(a) an auxiliary pressure chamber, the volume of said auxiliary chamber being substantially less than that of the decompression chamber;

(b) a valve controlled passageway connecting said chambers together;

(c) an exhaust manifold assembly communicating between the interior and exterior of the decompression chamber for controlling the exhaust of air therefrom and having a plurality of valve controlled exhaust lines;

(d) differential pressure responsive means connected between said chambers for developing an output signal proportional to the differential pressure;

(e) absolute pressure responsive means for developing an output signal proportional to the pressure of the decompression chamber;

(f) and a control center receiving as an input the signals from said pressure responsive means for controlling said valves, said control center opening said valve controlled passageway and closing said valve controlled exhaust lines to equalize the pressure in said chambers when a predetermined increment of pressure difference exists therebetween, said valve controlled passageway being closed when the pressure is equalized and a predetermined number of said exhaust lines being opened, said number of exhaust lines dependent on the absolute pressure of the decompression chamber so that the rate of decrease of pressure is substantially constant.

3. The automatic control system as substantially described in claim 2, wherein each of the valve controlled exhaust lines have different sized flow areas so that the exhaust of air from the decompression chamber may be further variably controlled and the rate of decrease of pressure may be held constant despite the change in absolute pressure.

4. The automatic control system as substantially described in claim 3, wherein there are four valve controlled exhaust lines having flow areas sized in the ratio of 1:2:4:8, thereby obtaining a total of fifteen combinations of flow area which may be selected.

5. The automatic control system as substantially described in claim 2, wherein the exhaust manifold assembly further includes:

(a) an emergency valve controlled by a signal from the control center to close upon the failure of the system to maintain a substantially constant rate of decrease of pressure, thereby to prevent the exhaust of air from the exhaust lines;

(b) and an additional valve controlled exhaust line to be operated manually to decrease the pressure in the decompression chamber upon the failure of the system.

6. The automatic control system as substantially described in claim 2, further including:

(a) a back-up auxiliary pressure chamber, the volume of said back-up chamber equal to the auxiliary pressure chamber;

(b) a back-up valve controlled passageway connecting the back-up chamber to the decompression chamber;

(c) a back-up differential pressure responsive means connected between the back-up chamber and the decompression chamber for developing an output signal proportional to the differential pressure;

(d) and the control center receiving as an input the signal from said last mentioned pressure responsive means for controlling said back-up valve, said control center operatively responsive to said back-up pressure responsive means upon a failure of the differential pressure responsive means or the failure of the valve controlled passageway to close.

7. The automatic control system as substantially described in claim 6, wherein there are four valve controlled exhaust lines having flow areas sized in the ratio of 1:2:4:8, thereby obtaining a total of fifteen combinations of flow area which may be selected so that the exhaust of air from the decompression chamber may be further variably controlled and the rate of decrease of pressure may be held constant despite the change in absolute pressure.

8. The automatic control system as substantially described in claim 7, wherein:

(a) the exhaust manifold assembly further includes an emergency valve and a manual valve controlled exhaust line, said emergency valve controlled by a signal from the control center to close upon the failure of the system to maintain a substantially constant rate of decrease of pressure, thereby to prevent the exhaust of air from the exhaust lines;

(b) and a visual display means to indicate the system failure so that the manual valve controlled exhaust line may be operated to decrease the pressure in the decompression chamber.

References Cited

UNITED STATES PATENTS

| 3,232,309 | 2/1916 | Eichenauer | 137—487.5 X |
| 3,405,629 | 10/1968 | Krasberg | 98—1.5 |
| 3,415,247 | 12/1968 | Lauvel | 128—204 |

ALAN COHAN, Primary Examiner

U.S. Cl. X.R.

98—1.5; 128—204; 137—624.18